(12) United States Patent
Kotragouda Basappa et al.

(10) Patent No.: US 10,317,917 B2
(45) Date of Patent: Jun. 11, 2019

(54) FLUID CONTROL APPARATUS HAVING VARIABLE AREA FLOW RESTRICTOR

(71) Applicant: EMERSON PROCESS MANAGEMENT REGULATOR TECHNOLOGIES, INC., McKinney, TX (US)

(72) Inventors: Madhusudhan Reddy Kotragouda Basappa, Frisco, TX (US); Mark A. Michnevitz, Frisco, TX (US); Jake Buford, The Colony, TX (US)

(73) Assignee: EMERSON PROCESS MANAGEMENT REGULATOR TECHNOLOGIES, INC., McKinney, TX (US)

( * ) Notice: Subject to any disclaimer, the term of this patent is extended or adjusted under 35 U.S.C. 154(b) by 0 days.

(21) Appl. No.: 15/945,311

(22) Filed: Apr. 4, 2018

(65) Prior Publication Data

US 2018/0223999 A1 Aug. 9, 2018

Related U.S. Application Data

(63) Continuation-in-part of application No. 15/291,595, filed on Oct. 12, 2016, now abandoned, and a
(Continued)

(51) Int. Cl.
*G05D 16/06* (2006.01)
*F16K 1/02* (2006.01)
(Continued)

(52) U.S. Cl.
CPC .......... *G05D 16/0636* (2013.01); *F16K 1/02* (2013.01); *F16K 31/1262* (2013.01);
(Continued)

(58) Field of Classification Search
CPC .......... F16K 1/02; F16K 31/1262; F23N 1/08; F23N 2035/16; F23N 2035/24; Y10T 137/7768; G05D 16/0636
(Continued)

(56) References Cited

U.S. PATENT DOCUMENTS 2,747,606 A 5/1956 Adams
2,955,612 A 10/1960 Moser
(Continued)

FOREIGN PATENT DOCUMENTS

CN 2130991 Y 4/1993
CN 2188148 Y 1/1995
(Continued)

OTHER PUBLICATIONS

ACL Manufacturing Inc., "Valve Trains," [http://acl-manufacturing.com/valve_trains.html], retrieved on Jul. 28, 2015, 3 pages.
(Continued)

*Primary Examiner* — William M McCalister
(74) *Attorney, Agent, or Firm* — Marshall, Gerstein & Borun LP

(57) ABSTRACT

A fluid regulator having a valve body defining an inlet, an outlet, a loading port, an access port, and a loading chamber disposed within the valve body and coupled to the loading port. A valve assembly is at least partially disposed between the inlet and the outlet and in communication with the loading chamber and is adapted to cooperate with the loading chamber to adjust fluid flow at the outlet by adjusting a fluid flow rate between the inlet and the outlet. A restrictor is at least partially disposed within the access port and the loading chamber and the valve assembly are adapted to be responsive to a change in loading pressure such that a
(Continued)

modified rate is achieved and the restrictor is adapted to adjust a response speed in which the modified rate is achieved.

14 Claims, 9 Drawing Sheets

Related U.S. Application Data continuation-in-part of application No. 14/792,068, filed on Jul. 6, 2015, now Pat. No. 9,939,068.

(60) Provisional application No. 62/240,394, filed on Oct. 12, 2015.

(51) Int. Cl.
  *F16K 31/126* (2006.01)
  *G05D 1/00* (2006.01)
  *F23N 1/08* (2006.01)

(52) U.S. Cl.
  CPC .............. *F23K 2401/201* (2013.01); *F23K 2900/05002* (2013.01); *F23N 1/08* (2013.01); *F23N 2035/16* (2013.01); *F23N 2035/20* (2013.01); *F23N 2035/24* (2013.01); *G05D 1/00* (2013.01)

(58) Field of Classification Search
  USPC .................................................. 137/489.5
  See application file for complete search history.

(56) References Cited

U.S. PATENT DOCUMENTS

| | | | |
|---|---|---|---|
| 3,106,934 A | 10/1963 | Rogers | |
| 3,477,466 A | 11/1969 | Sturm | |
| 3,593,741 A | 7/1971 | Odenthal et al. | |
| 3,692,049 A | 9/1972 | Norton et al. | |
| 3,814,375 A | 6/1974 | Grotloh | |
| 3,865,128 A | 2/1975 | Zadoo | |
| 4,084,539 A | 4/1978 | Schmidt | |
| 4,490,836 A | 12/1984 | Grotloh | |
| 4,503,884 A | 3/1985 | Spils | |
| 4,552,173 A | 11/1985 | Vayra | |
| 4,552,330 A | 11/1985 | Grotloh | |
| 4,589,627 A | 5/1986 | Grotloh | |
| 4,667,695 A | 5/1987 | Gold et al. | |
| 4,716,927 A * | 1/1988 | Vayra | F16K 17/105 137/490 |
| 5,988,202 A | 11/1999 | Spitzer, Sr. | |
| 9,194,510 B2 * | 11/2015 | Arai | F16K 31/406 |
| 2005/0058961 A1 * | 3/2005 | Moses | F23D 14/60 431/90 |
| 2008/0078967 A1 * | 4/2008 | Ochiai | F16K 31/1262 251/61 |
| 2009/0120508 A1 * | 5/2009 | Yeater | F04D 9/006 137/197 |
| 2010/0025603 A1 | 2/2010 | Burlage et al. | |
| 2013/0042931 A1 | 2/2013 | Vasquez et al. | |

FOREIGN PATENT DOCUMENTS

| | | |
|---|---|---|
| CN | 2206394 Y | 8/1995 |
| DE | 1038445 B | 9/1958 |
| DE | 1803166 A1 | 9/1969 |
| DE | 1550464 B1 | 12/1969 |
| DE | 403844 A1 | 6/1992 |
| GB | 251392 A | 5/1926 |
| GB | 847361 A | 9/1960 |
| WO | WO-0198694 A1 | 12/2001 |
| WO | WO-2017/007794 A1 | 1/2017 |

OTHER PUBLICATIONS

Canalta Controls Group, "Combustex Burner Ignition and Control Systems," Operations Manual, 2011, 44 pages.
Emerson Process Management, "Fisher easy-Drive Electric Actuators," Brochure, Apr. 2013, 4 pages.
Emerson Process Management, "Oilfield Burner Pressure Control System," Brochure, Apr. 2015, 6 pages.
Emerson, "ASCO Redhat," Oct. 2013, Manual, 24 pages.
International Search Report and Written Opinion, corresponding International Application No. PCT/US16/56495, dated Dec. 21, 2016.
International Searching Authority, "International Search Report," issued in connection with International Patent Application No. PCT/US2016/041051, dated Oct. 6, 2016, 3 pages.
Kimray Inc., "High Pressure Control Valves," Manual, Jun. 2014, 7 pages.
Kimray Inc., "Low Pressure Motor Valves," Manual, Jan. 2013, 5 pages.
Nternational Searching Authority, "Written Opinion," issued in connection with International Patent Application No. PCT/US2016/041051, dated Oct. 6, 2016, 6 pages.
Peter Paul, "3-Way Normally Closed (exhaust to atmosphere)," Specifications, [http://peterpaul.com/valves/3-way-normally-closed-exhaust-to-atmosphere], retrieved on Jul. 28, 2015, 2 pages.
Platinum Control, "Quick Connect Unit," [http://platinumcontrol.com/wp-content/uploads/2014/07/Quick-Connect-Unit1.pdf], retrieved on Jul. 28, 2015, 1 page.
Profire Energy, "The Role of Burner Management," [http://www.profireenergy.com/role-of-bms/], retrieved on Jul. 28, 2015, 4 pages.
Communication Pursuant to Article 94(3) for EP Application No. 16 788 856.9 dated Jan. 22, 2019, 5 pgs.
First Office Action for CN Application No. 201610530717.6 dated Feb. 1, 2019, 18 pgs.

* cited by examiner

FLUID CONTROL APPARATUS HAVING VARIABLE AREA FLOW RESTRICTOR

CROSS-REFERENCE TO RELATED APPLICATIONS

This application is a continuation-in-part of U.S. patent application Ser. No. 14/792,068, entitled "Fluid Control Apparatus Having Flow Restrictors" and filed Jul. 6, 2015, and U.S. patent application Ser. No. 15/291,595, entitled "Variable Area Flow Restriction" and filed Oct. 12, 2016, which claims priority to U.S. Provisional Patent Application No. 62/240,394, entitled "Variable Area Flow Restriction" and filed Oct. 12, 2015, the entire disclosures of which are hereby incorporated by reference herein.

FIELD OF THE DISCLOSURE

The present disclosure relates generally to fluid control apparatus and, more particularly, to fluid control apparatus having flow restrictors to adjust the speed in which a fluid control apparatus responds to a change in operating pressure.

BACKGROUND

Many process control systems use fluid control apparatus, such as fluid regulators, to control a pressure of a fluid. Pressure reducing fluid regulators are commonly used to receive a relatively high pressure fluid and output a relatively lower regulated output fluid pressure. In this manner, despite the pressure drop across the regulator, a pressure reducing regulator can provide a relatively constant fluid pressure output for a wide range of output loads (i.e., flow requirements, capacity, etc.). For example, a fluid regulator associated with a piece of equipment (e.g., a boiler or burner) may receive a fluid (e.g., fuel or gas) having a relatively high and somewhat variable pressure from a fluid distribution source and may regulate the fluid to have a lower, substantially constant pressure suitable for safe, efficient use by the equipment (e.g., a burner) downstream from the fluid regulator.

Due to the instability of certain types of fluid control apparatus at particular flow rates, the speed in which the apparatus responds to the change in flow rates and/or desired pressures may be unsuitably fast or slow for proper operation of the apparatus. As such, the apparatus may perform at a reduced accuracy during subsequent flow conditions, and may ultimately lead to damage of the apparatus. Dampers and restrictors have been used to limit the speed in which the apparatus responds to the change in flow rates, but these components oftentimes require a skilled technician to manually open and adjust the restrictor to increase the inlet flow. These restrictors and dampers oftentimes include complicated, costly componentry and may be prone to serviceability issues.

BRIEF SUMMARY OF THE DISCLOSURE

In accordance with one exemplary aspect of the present invention, a fluid regulator comprises a valve body defining an inlet, an outlet, a loading port, and an access port. A loading chamber is disposed within the valve body and coupled to the loading port and a valve assembly is at least partially disposed between the inlet and the outlet and in communication with the loading chamber. The valve assembly is adapted to cooperate with the loading chamber to adjust fluid flow at the outlet by adjusting a fluid flow rate between the inlet and the outlet. A restrictor is at least partially disposed within the access port and the loading chamber and the valve assembly are adapted to be responsive to a change in loading pressure, such that a modified rate is achieved and the restrictor is adapted to adjust a response speed in which the modified rate is achieved.

In further accordance with any one or more of the foregoing exemplary aspects of the present invention, a fluid regulator may further include, in any combination, any one or more of the following preferred forms.

In one preferred form, the restrictor comprises a tapered end that is adjustable to obtain a plurality of response speeds.

In another preferred form, the restrictor further comprises a threaded portion adapted to be threadably inserted into the access port.

In another preferred form, upon the loading pressure changing, the loading chamber is adapted to experience a change in pressure which causes the valve assembly to cause the modified rate to be achieved.

In another preferred form, the fluid regulator comprises a transition portion positioned between a first portion and a second portion of a loading fluid pathway and the restrictor is adapted to be at least partially disposed within the transition portion to adjustably restrict a flow rate of fluid propagating through the loading fluid pathway.

In another preferred form, the restrictor comprises a threaded portion.

In another preferred form, the fluid regulator comprises a diaphragm at least partially disposed within the loading chamber and the diaphragm is adapted to move in response to the change in loading pressure to equalize the loading pressure in the loading chamber with a force exerted by a biasing element.

In another preferred form, the restrictor includes a seal for sealing the restrictor within the access port.

In accordance with another exemplary aspect of the present invention, an apparatus for adjusting a flow rate into a loading chamber of a fluid regulator comprises a restrictor adapted to be at least partially disposed in an access port and a loading fluid pathway. The restrictor comprises a screw extending along a longitudinal axis and a tapered end. The tapered end has a cross-section wherein a cross-sectional area decreases along a length of the tapered end such that when the restrictor is inserted into the access port and restricts the flow rate propagating through the loading fluid pathway based on an insertion depth.

In further accordance with any one or more of the foregoing exemplary aspects of the present invention, an apparatus may further include, in any combination, any one or more of the following preferred forms.

In one preferred form, the restrictor includes a threaded portion to threadably couple the restrictor to the access port.

Figure 1:
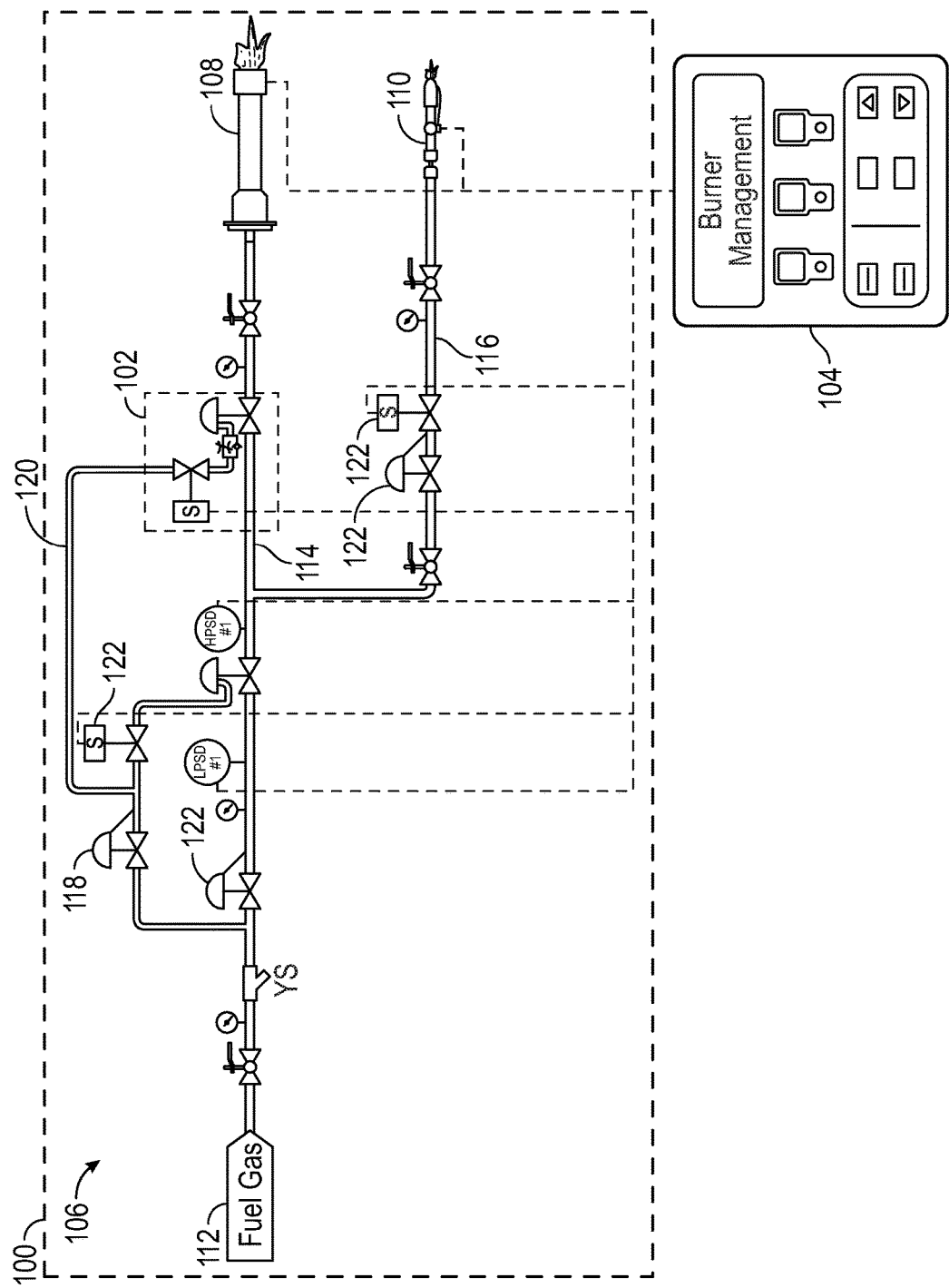
FIG. 1 is a schematic illustration of an example system implemented with an example fluid regulator constructed in accordance with the teachings of this disclosure.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein. Wherever possible, the same reference numbers will be used throughout the drawing(s) and accompanying written description to refer to the same or like parts.

DETAILED DESCRIPTION

Fluid or pressure regulators often receive a supply fluid from an upstream fluid distribution source having a relatively high pressure and regulate the pressure of the supply for use with a downstream demand source, a pressure regulator, or any other custody point that demands process fluid at a desired (e.g., lower) pressure. The example actuators disclosed herein may be employed with fluid regulators to prevent and/or reduce excess gas (e.g., combustible gas) accumulation or build-up, backfire and/or pilot flame blow-out during operation (e.g., during an ignition stage of a main burner). To prevent gas build up, backfire and/or pilot flame blowout, the actuators disclosed herein employ a speed flow apparatus to control a rate or speed at which a fluid regulator moves from a closed position (e.g., a fully closed position preventing a supply fluid (e.g., a combustible gas) from flowing toward an outlet) to an open position (e.g., a fully open position allowing fluid flow to the outlet). In some examples, the speed flow apparatus may be adjustable to enable an increase or decrease of the rate or speed at which the fluid regulator moves from the closed position toward the open position. By controlling the speed at which the fluid regulator moves from a closed position to an open position, the example actuators disclosed herein may be used to reduce pilot blow-off and/or back fire that may otherwise occur when a fluid regulator opens too quickly during, for example, an ignition sequence of a burner.

Further, to enable relatively quick shut-off of the example fluid regulators, the actuators disclosed herein can employ an exhaust apparatus that is not affected by the speed flow apparatus. Thus, although the speed control apparatus controls a rate at which the fluid regulator moves from the closed position to the open position, the speed control apparatus does not affect a speed at which the fluid regulator moves from the open position to the closed position.

The example actuators disclosed herein may be used to retrofit existing fluid regulators and/or actuators in the field. In other words, the actuators disclosed herein may be provided separately or as individual units. In some examples, only a housing of the example actuators disclosed herein may be provided (e.g., to retrofit existing actuators in the field). Thus, the example actuator apparatus disclosed herein may implement a fluid regulator assembly at the factory or may be provided (e.g., sold) as an independent unit to retrofit existing fluid regulators and/or actuators in the field.

FIG. 1 is a schematic illustration of an example burner system 100 (e.g., a fire tube vessel or direct-fire heater) that may be implemented with an example fluid regulator 102 constructed in accordance with the teachings of this disclosure. For example, the burner system 100 of FIG. 1 may be employed to provide heat to a process fluid of an oil and/or natural gas application or process (e.g., a fuel refining application). The system 100 of the illustrated example employs a burner management system 104 to enable start-up or ignition, operation and/or shut down of a burner section 106 of the burner system 100. The burner section 106 of the example burner system 100 includes a main burner 108 to provide heat to a process fluid and a pilot burner 110 that is used to ignite the main burner 108. The main burner 108 and the pilot burner 110 of the illustrated example receive a supply fluid (e.g., a combustible gas or fuel such as natural gas) from a fuel supply source 112. The main burner 108 is fluidly coupled to the supply source 112 via a main line 114 and the pilot burner 110 is fluidly coupled to the supply source 112 via a pilot line 116. The fluid regulator 102 is fluidly coupled to the main line 114 and controls the supply fluid flow to the main burner 108 based on a loading pressure provided to the fluid regulator 102 by a loading regulator 118 via a loading line 120. The loading fluid has a pressure that is less than a pressure of the supply fluid upstream from the fluid regulator 102 and greater than a pressure of the supply fluid downstream from the fluid regulator 102. The main line 114, the pilot line 116 and/or the loading line 120 may include one or more fluid control components 122 (e.g., fluid regulators and/or solenoid valves) to prevent or restrict the supply fluid flowing to the main burner 108 and/or the pilot burner 110.

In operation, the burner management system 104 monitors and/or manages the ignition, shutdown and/or operation of the main burner 108 to control a temperature of a process fluid to a desired temperature. For example, the burner management system 104 adjusts the heat output of the main burner 108 via the fluid regulator 102 to accurately control a temperature of a process fluid while increasing an efficiency of the burner system 100 during operation. To increase burner efficiency, the burner management system 104 may be configured to manage a user defined temperature setpoint ensuring that the main burner 108 is turned on (e.g., burning fuel) only when needed. For example, the burner management system 104 detects a flame absence (e.g., via a flame sensor such as a flame ionization rod, an ultraviolet or infrared scanner, etc.) of the main burner 108 and ignites the main burner 108 via the pilot burner 110 when additional heat is needed.

The burner management system 104 may employ a processor or logic responsive to process signals (e.g., from a temperature sensor) representative of a temperature of a process fluid that is to be heated by the main burner 108. Based on the received signals, the burner management system 104 provides (e.g., via a wireless or wired connections) control function signals to the various fluid control components 122 and/or the fluid regulator 102 of the burner system 100. For example, if a signal received is indicative of a temperature of a process fluid that is below a threshold temperature, the burner management system 104 causes the main burner 108 to ignite if the burner management system 104 detects a flame absence at the main burner 108. To ignite the main burner 108, the burner management system 104 commands the fluid regulator 102 to move to an open position to allow the supply fluid to flow to the main burner 108. The supply fluid to the main burner 108 is ignited by the pilot burner 110.

To prevent and/or reduce excess gas build up, backfire and/or pilot flame blowout during ignition of the main burner 108, the example fluid regulator 102 of the illustrated example controls a rate at which the fluid regulator 102 moves to an open position to allow the supply fluid to flow to the main burner 108. In this manner, the example fluid regulator 102 of the illustrated example regulates (e.g., via a controller) a rate at which the fluid regulator 102 moves from a closed position to an open position to control to control a flow rate of supply fluid to the main burner 108.

Figure 2:
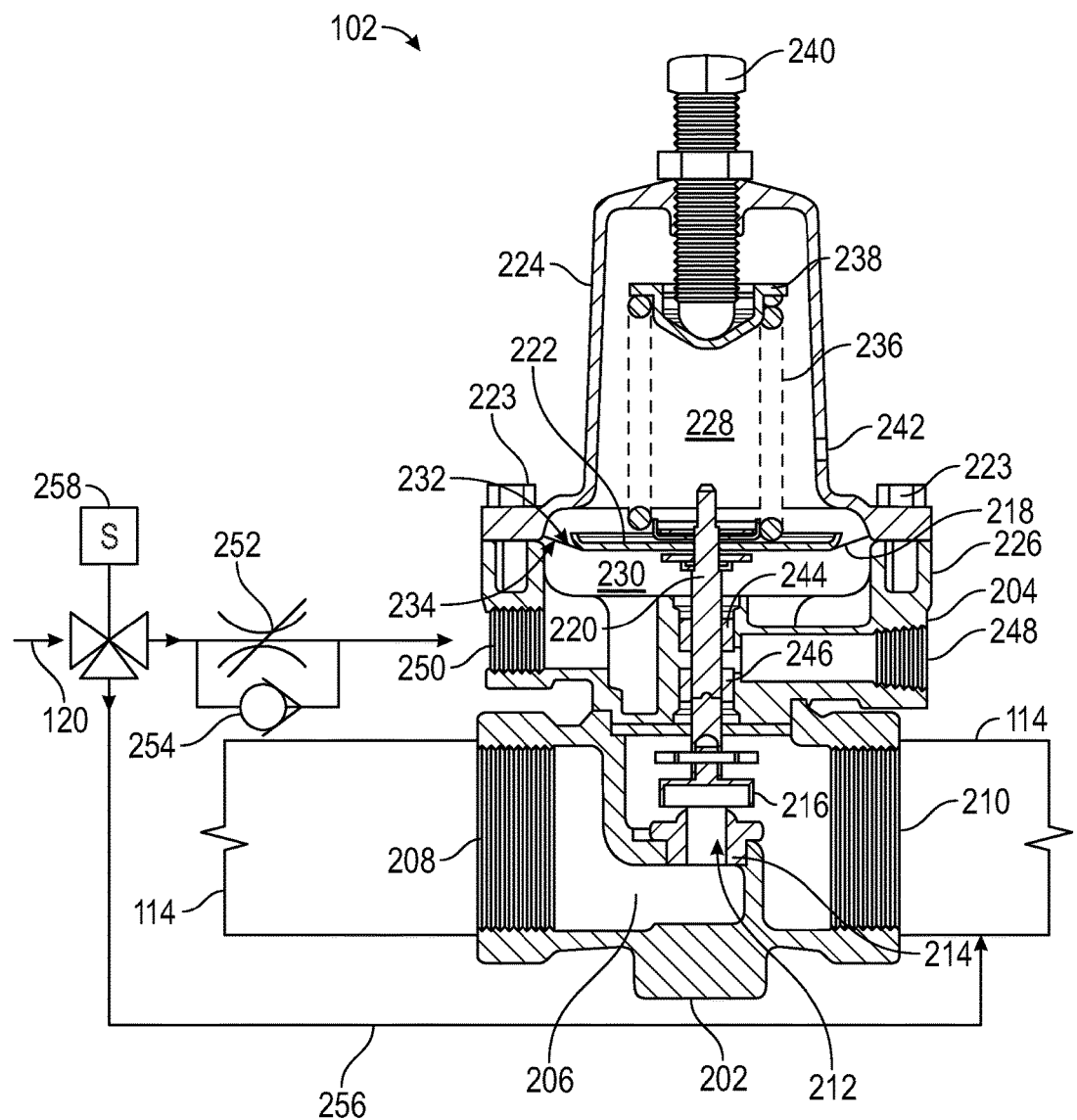
FIG. 2 is a cross-sectional, schematic illustration of the example fluid regulator of FIG. 1.

FIG. 2 is a cross-sectional, schematic illustration of the example fluid regulator 102 of FIG. 1. The fluid regulator 102 of the illustrated example includes a regulator body 202 coupled to an actuator 204. The regulator body 202 defines a fluid flow passageway 206 between an inlet 208 and an outlet 210. The inlet 208, for example, is fluidly coupled to the supply source 112 (FIG. 1) via the main line 114 and the outlet 210 is fluidly coupled to the main burner 108. The fluid flow passageway 206 defines an orifice 212 between the inlet 208 and the outlet 210. The orifice 212 is defined by a valve seat 214 positioned in the fluid flow passageway 206 and removably coupled to the regulator body 202.

The actuator 204 of the illustrated example moves a flow control member 216 (e.g., a valve plug) in the fluid flow passageway 206 adjacent the valve seat 214 to control (e.g., shut-off, throttle, etc.) fluid flow between the inlet 208 and the outlet 210. For example, the actuator 204 moves the flow control member 216 relative to the valve seat 214 between a first position at which the flow control member 216 is sealingly engaged with the valve seat 214 to prevent supply fluid flow between the inlet 208 and the outlet 210 (e.g., a fully closed position), and a second position at which the flow control member 216 is spaced away or disengaged from the valve seat 214 to allow the supply fluid flow between the inlet 208 and the outlet 210 (e.g., an open position). To move the flow control member 216 relative to the valve seat 214, the actuator 204 of the illustrated example includes a diaphragm 218 operatively coupled to the flow control member 216 via a valve stem 220 and a diaphragm plate 222. The diaphragm 218 is captured between a first housing 224 of the actuator 204 and a second housing 226 of the actuator 204 removably coupled to the first housing 224 via fasteners 223. Specifically, a first side 232 of the diaphragm 218 and the first housing 224 define a first chamber 228 (e.g., a spring chamber) of the actuator 204 and a second side 234 of the diaphragm 218 and the second housing 226 define a second chamber 230 (e.g., a loading chamber) opposite the first chamber 228. A biasing element or spring 236 is disposed within the first chamber 228 between the diaphragm plate 222 and an adjustable spring seat 238. A spring adjuster 240 (e.g., a screw) enables adjustment (e.g., an increase or decrease) of an amount of a pre-set force or load that the spring 236 exerts on the first side 232 of the diaphragm 218 to provide a desired pressure set point or outlet pressure. In this example, the first chamber 228 is fluidly coupled to, for example, the atmosphere, via a vent or aperture 242. Additionally, to detect leakage through a seal assembly 244 (e.g., packing) positioned within a bore 246 of the actuator 204 and/or the regulator body 202 through which the valve stem 220 slides, the actuator 204 of the illustrated example includes a leak detection pathway or port 248.

The example fluid regulator 102 includes a loading or inlet port 250 to fluidly couple the loading fluid (FIG. 1) provided by the loading regulator 118 (FIG. 1) to the second chamber 230. To control (e.g., reduce or restrict) a flow rate of the loading fluid to the second chamber 230, the example fluid regulator 102 of the illustrated example includes a controller or speed control device 252 (e.g., a restrictor, a valve, etc.). Also, to enable relatively quick evacuation of the loading fluid from the second chamber 230 (e.g., substantially instantaneously, less than one second, etc.), the fluid regulator 102 includes a fluid control device 254 (e.g., a check valve). In some examples, the fluid control device 254 may be formed or implemented with the speed control device 252. In some such examples, the speed control device 252 may be implemented as a fluid flow restrictor that includes a one-way check valve implemented within the restrictor. In some examples, the fluid control device 254 may be formed as a separate component and/or spaced apart from the speed control device 252. In some such examples, the speed control device 252 may be a restrictor positioned within the second housing 226 between the inlet port 250 and the second chamber 230, and the fluid control device 254 may be a one-way check valve positioned between the second chamber 230 and an exhaust pathway 256.

A solenoid valve 258 (e.g., a three-way solenoid valve) moves between a first position (e.g., a closed position) and a second position (e.g., an open position) to control or allow the loading fluid to flow to the second chamber 230 via the inlet port 250 and the speed control device 252. For example, during ignition of the main burner 108 (FIG. 1), the burner management system 104 of FIG. 1 commands the solenoid valve 258 to move to the second position to allow the loading fluid to flow to the inlet port 250. During shut-off of the main burner 108, the burner management system 104 of FIG. 1 commands the solenoid valve 258 to move between the second position (e.g., the open position) and a third position (e.g., an exhaust position) to enable the loading fluid in the second chamber 230 to exhaust or evacuate from the second chamber 230. The loading fluid is exhausted to the main line 114 downstream of the outlet 210 via the fluid control device 254 and the exhaust pathway 256. In some examples, the solenoid valve 258 may be separate from the regulator body 202, the actuator 204 and/or, more generally, the fluid regulator 102. In some examples, the solenoid valve 258 may be positioned within the regulator body 202, the actuator 204 and/or, more generally, the fluid regulator 102 (e.g., positioned within a dimensional envelope of the regulator body 202, the actuator 204 and/or the fluid regulator 102).

In operation, to ignite the main burner 108, the burner management system 104 of FIG. 1 provides a signal to the solenoid valve 258 to move to a position (e.g., an open position) that allows the loading fluid to flow into the second chamber 230. The speed control device 252, in turn, restricts a rate at which the loading fluid flows into the second chamber 230. In this manner, the second chamber 230 fills at a relatively slow rate compared to a fluid regulator that is not implemented with the speed control device 252. As a result, the loading fluid gradually increases a pressure exerted on the second side 234 of the diaphragm 218 as the loading fluid fills the second chamber 230, causing the flow control member 216 to gradually or slowly move away or disengage from the valve seat 214 as the flow control member 216 moves from a closed position sealingly engaged with the valve seat 214 (e.g., a fully closed position) to an open position spaced away or disengaged from the valve seat 214. For example, the speed control device 252 may be configured or adjusted to cause the flow control member 216 to move between the fully closed position and a fully opened position in approximately 2 seconds to 10 seconds. Such a gradual opening or separation between the flow control member 216 and the valve seat 214 allows the supply fluid to flow across the orifice 212 at a relatively slow rate. By controlling the speed at which the flow control member 216 moves from a closed position to an open position, the fluid regulator 102 reduces or substantially prevents pilot blow-off and/or back fire that may otherwise occur when a fluid regulator opens too quickly and a surge and/or excessive accumulation of the supply fluid flows to the main burner 108 during ignition (e.g., prior to ignition). For example, a surge of supply fluid to the main burner 108 may cause the pilot burner 110 to blow out or extinguish when the fluid regulator 102 moves to the open position too quickly (e.g., pilot light blow-off). In some examples, accumulation and/or excessive supply fluid at the main burner 108 during the ignition stage or start-up may cause a back fire or small explosion. Thus, the example fluid regulator 102 provides a controlled flow rate of supply fluid to reduce or prevent a surge and/or excessive supply fluid when igniting the main burner 108. For example, the fluid regulator 102 may be configured with an opening rate in compliance with Canadian Standards Act section 149.3 (CSA 149.3).

To shut-off the main burner 108, the burner management system 104 provides a signal to the solenoid valve 258 to move to a position (e.g., an exhaust position) that allows the loading fluid in the second chamber 230 to exhaust to the main line 114 via the fluid control device 254 and the exhaust pathway 256. When the second chamber 230 is evacuated or exhausted via the fluid control device 254, a force exerted on the second side 234 of the diaphragm 218 decreases below the pre-set force exerted on the first side 232 of the diaphragm 218 via the spring 236. When the pressure in the second chamber 230 is below the pressure in the first chamber 228, the spring 236 causes the diaphragm 218 to move toward the second chamber 230. In turn, the flow control member 216 moves toward the valve seat 214 to restrict or prevent the supply fluid flow between the inlet 208 and the outlet 210. For example, the flow control member 216 moves from the open position (e.g., a fully open position) to a closed position at which the flow control member 216 sealingly engages the valve seat 214 to prevent supply fluid flow between the inlet 208 and the outlet 210 (e.g., fully closed position). Although the example fluid regulator 102 enables gradual opening of the flow control member 216 from the closed position to the open position via the speed control device 252, the fluid control device 254 enables the flow control member 216 to move from the open position to the closed position substantially instantaneously (e.g., less than 3 seconds, less than one second, etc.). In other words, the flow control member 216 moves from the closed position to the open position at a speed or rate that is significantly slower than a speed or rate at which the flow control member 216 moves from the open position (e.g., a fully open position) to the closed position (e.g., a fully closed position). Thus, the fluid control device 254 provides substantially quick or rapid shut-off capability during, for example, an emergency condition.

Figure 3A:
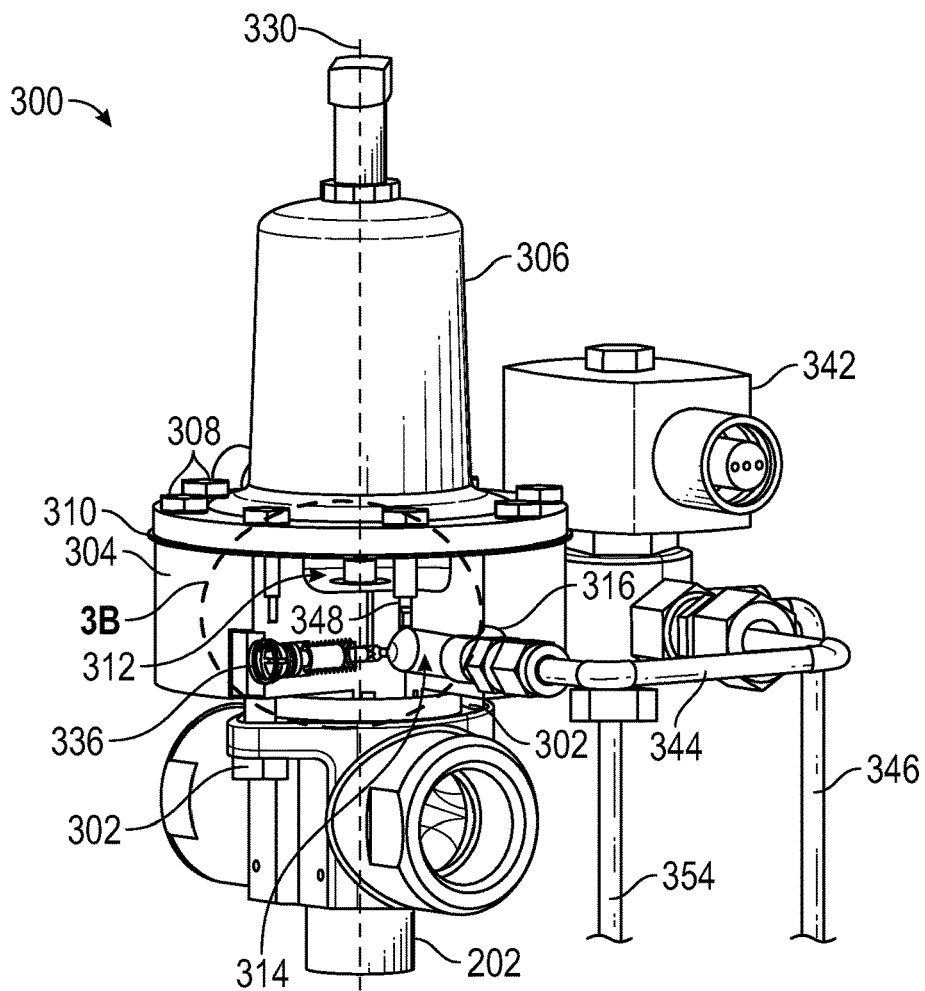
FIG. 3A is a perspective partial cutaway view of another example fluid regulator constructed in accordance with the teachings of this disclosure.

FIG. 3A is a perspective partial cutaway view of an actuator 300 constructed in accordance with the teachings of this disclosure. For example, the actuator 300 may be used to implement the example fluid regulator 102 and/or the example actuator 204 of FIGS. 1 and 2.

Figure 3B:
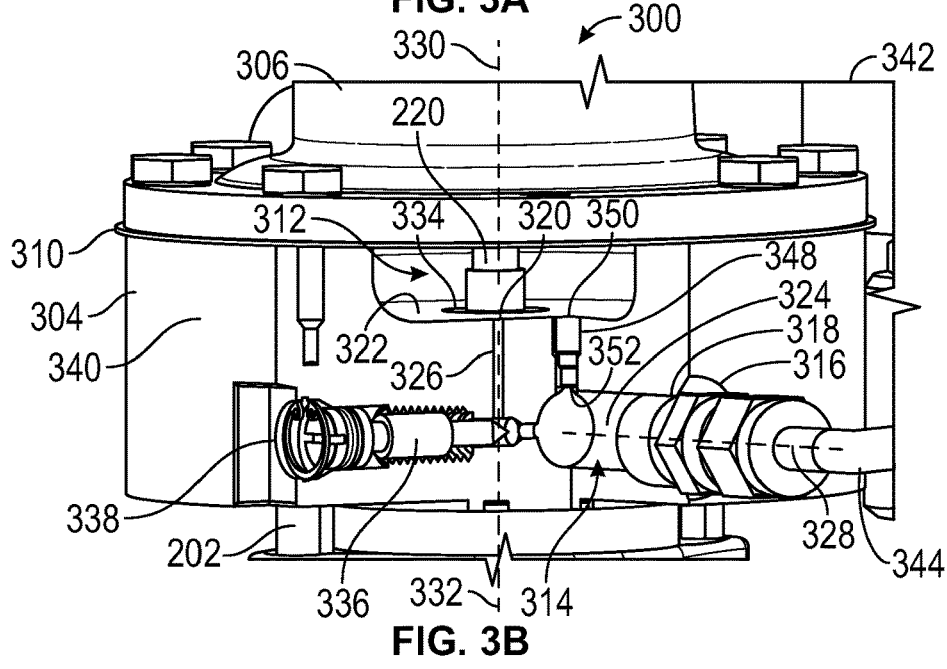
FIG. 3B is an enlarged view of a portion of the example fluid regulator of FIG. 3A.

FIG. 3B is an enlarged view of a portion of the example actuator 300 of FIG. 3A. Those components of the example actuator 300 that are substantially similar or identical to the components of the example actuator 204 and/or the fluid regulator 102 described above in connection with FIGS. 1 and 2 and that have functions substantially similar or identical to the functions of those components will not be described in detail again below. Instead, the interested reader is referred to the above corresponding descriptions. To facilitate this process, similar reference numbers will be used for like structures.

Referring to FIGS. 3A and 3B, the example actuator 300 is removably coupled to the regulator body 202 via, for example, fasteners 302. The actuator 300 of the illustrated example includes a first housing portion 304 (e.g., body) coupled to a second housing portion 306 (e.g., a cover cap) via a plurality of fasteners 308. An actuation member or diaphragm 310 is positioned between the first and second housing portions 304 and 306 to define a loading chamber 312. In some examples, the actuation member 310 may be a piston and/or any other suitable actuation member.

Referring to FIG. 3B, the first housing portion 304 of the actuator 300 defines a loading fluid pathway 314 to fluidly couple an inlet port 316 and the loading chamber 312. The loading fluid pathway 314 of the illustrated example includes a first inlet 318 defined by the inlet port 316 and a first outlet 320 in fluid communication with the loading chamber 312. In this example, the loading fluid pathway 314 is integrally formed in the first housing portion 304 of the actuator 300 and the first outlet 320 is formed in a surface 322 of the first housing portion 304 defining the loading chamber 312. The loading fluid pathway 314 includes a first portion 324 defining the inlet port 316 and a second portion 326 defining the first outlet 320. The first portion 324 of the loading fluid pathway 314 has an axis 328 that is substantially perpendicular relative to a longitudinal axis 330 of the actuator 300 and the second portion 326 has an axis 332 that is substantially parallel relative to the longitudinal axis 330 and/or substantially perpendicular relative to the axis 328. Although the axis 332 is substantially parallel relative to the longitudinal axis 330, the second portion 326 of the loading fluid pathway 314 is laterally offset or spaced from a central opening 334 of the first housing portion 304 that receives the valve stem 220 of the regulator body 202.

To control or regulate a flow rate of a loading fluid flowing to the loading chamber 312 via the loading fluid pathway 314, the actuator 300 of the illustrated example includes a restrictor 336. For example, the restrictor 336 may implement the example speed control device 252 of the example fluid regulator 102 of FIGS. 1 and 2. The restrictor 336 is interposed in the second portion 326 of the loading fluid pathway 314 to control or restrict fluid flow between the inlet port 316 and the loading chamber 312 (e.g., between the first portion 324 of the loading fluid pathway 314 and the first outlet 320). The restrictor 336 of the illustrated example is adjustable via an access port 338 accessible from an outer surface 340 of the actuator 300 or the first housing portion 304. As shown, the access port 338 is recessed relative to the outer surface 340 of the first housing portion 304. Additionally, the inlet port 316 of loading fluid pathway 314 is positioned approximately between thirty degrees and ninety degrees from the access port 338 relative to the longitudinal axis 330. The restrictor 336 is described in greater detail in connection with FIG. 4.

Referring to FIGS. 3A and 3B, a solenoid valve 342 (e.g., a three-way solenoid valve) fluidly couples the inlet port 316 and a loading fluid via tubing or piping 344. The solenoid valve 342 of the illustrated example is positioned adjacent the actuator 300 or upstream from the inlet port 316. In other words, the solenoid valve 342 is positioned outside a dimensional envelope of the actuator 300. The solenoid valve 342 may receive a command (e.g., from the burner management system 104 of FIG. 1) to move between a first position and a second position to enable a loading fluid to flow from a loading fluid line 346 (e.g., coupled to the loading line 120 of FIG. 1) to the inlet port 316 of the actuator 300 via the tubing 344.

To remove the loading fluid from the loading chamber 312, the example actuator 300 includes a fluid control device 348. The fluid control device 348 of the illustrated example is positioned between the loading chamber 312 and the inlet port 316 of the loading fluid pathway 314. In particular, the fluid control device 348 has a second inlet 350 in fluid communication with the loading chamber 312 and a second outlet 352 in fluid communication with the inlet port 316 via the first portion 324 of the loading fluid pathway 314. The solenoid valve 342 may receive a command (e.g., from the burner management system 104 of FIG. 1) to move between the second position and a third position to fluidly couple the inlet port 316 to an exhaust line 354 via the tubing 344. When the solenoid valve 342 is in the third position, the loading fluid from the loading fluid line 346 is blocked to prevent the loading fluid from flowing to the inlet port 316 via the tubing 344. Instead, the loading fluid pathway 314 is fluidly coupled to the exhaust line 354 via the tubing 344 to provide a (e.g., reverse) flow path to exhaust the loading fluid from the loading chamber 312. In particular, the absence of the loading fluid in the first portion 324 of the loading fluid pathway 314 and the presence of the loading fluid in the loading chamber 312 causes a pressure differential across the fluid control device 348 that is greater than a threshold pressure differential. As a result, the fluid control device 348 moves to an open position to exhaust the loading chamber 312 via the tubing 344 and the exhaust line 354.

On the other hand, when the first portion 324 of the loading fluid pathway 314 is fluidly coupled to the loading fluid line 346 via the tubing 344, a pressure differential across the fluid control device 348 is less than the pressure differential threshold, thereby causing the fluid control device 348 to move to a closed position and prevent fluid flow across the fluid control device 348 between the loading chamber 312 and the loading fluid pathway 314. The fluid control device 348 is discussed in greater detail in connection with FIGS. 5A and 5B.

Figure 4:
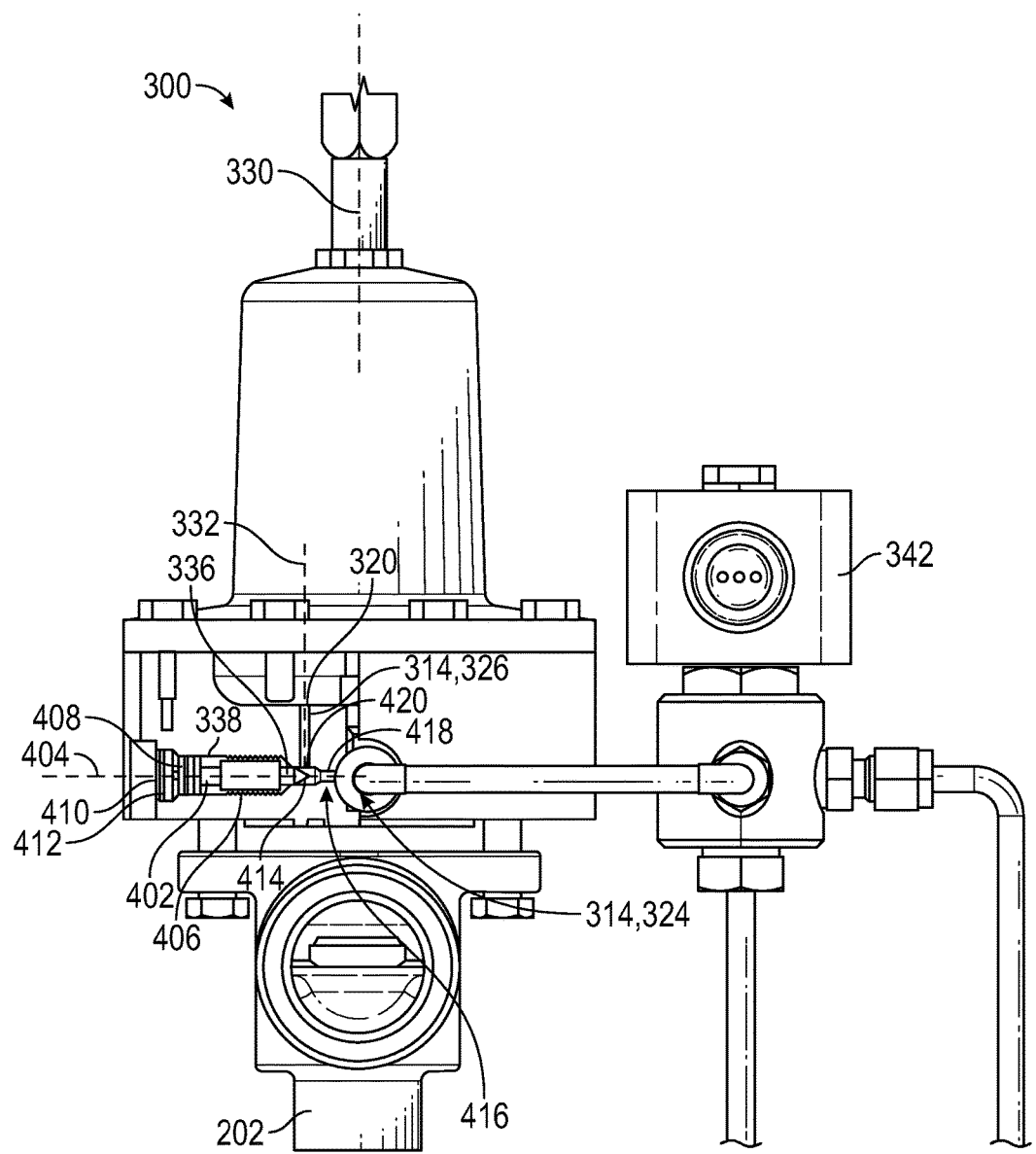
FIG. 4 is a side partial cutaway view of the example fluid regulator of FIGS. 3A and 3B.

FIG. 4 is a side partial cutaway view of the example actuator 300 of FIGS. 3A and 3B. The restrictor 336 of the illustrated example includes a screw 402 having an axis 404 that is substantially perpendicular to the axis 332 of the second portion 326 of the loading fluid pathway 314. The restrictor 336 includes a threaded portion 406 threaded within the access port 338 of the first housing portion 304 to enable a position of the restrictor 336 to move between a first position (e.g., a fully open position) and a second position (e.g., a fully closed position) to vary or adjust a fluid flow rate of the loading fluid flowing to the loading chamber 312 via (e.g., the second portion of) the loading fluid pathway 314. Specifically, the flow rate through the loading fluid pathway 314 may be adjusted between a first flow rate (e.g., a maximum flow rate) when the restrictor 336 is in the first position (e.g., a fully open position) and a second flow rate (e.g., a minimum flow rate) less than the first flow rate when the restrictor 336 is in the second position (e.g., a fully closed position). The restrictor 336 includes a seal 408 to prevent the loading fluid in the second portion 326 of the loading fluid pathway 314 from flowing through an opening 410 of the access port 338. A locking pin 412 retains the restrictor 336 within the access port 338 and prevents the restrictor 336 from being removed (e.g., fully removed) from the access port 338. In some examples, the locking pin 412 limits or prevents movement of the restrictor 336 beyond the first position. In the illustrated example, an end 414 of the restrictor 336 moves within a transition portion 416 of the loading fluid pathway 314 that fluidly couples the first portion 324 and the second portion 326. The transition portion 416 may include a stop 418 to limit or prevent movement (e.g., of the end 414) of the restrictor 336 beyond the second position. In particular, the stop 418 of the transition portion 416 includes a profile or shape that is complementary to a profile or shape of the end 414 of the restrictor 336.

The restrictor 336 may be moved to the first position by rotating the restrictor 336 in a first direction about the axis 404 and the restrictor 336 may be moved to the second position by rotating the restrictor 336 in a second direction about the axis 404 opposite the first direction. In the first position, at least a portion of the end 414 of the restrictor 336 positioned in the transition portion 416 is spaced from an opening 420 of the second portion 326 of the loading fluid pathway 314 to enable fluid flow between the first portion 324 and the second portion 326 of the loading fluid pathway 314. Thus, in the first position, the end 414 of the restrictor 336 uncovers at least a portion of the opening 420 to increase a flow rate of the loading fluid flowing to the loading chamber 312 via the second portion 326 of the loading fluid pathway 314. In the second position, the end 414 of the restrictor 336 is positioned adjacent the opening 420 such that the end 414 obstructs (e.g., at least partially obstructs) or at least partially covers the opening 420 of the second portion 326 of the loading fluid pathway 314. Thus, in the second position, the end 414 of the restrictor 336 obstructs or blocks at least a portion of the opening 420 of the second portion 326 to decrease a flow rate of the loading fluid flowing to the loading chamber 312 via the second portion 326 of the loading fluid pathway 314. In some examples, the restrictor 336 completely blocks or covers the opening 420 when the restrictor 336 is in the second position to prevent fluid flow through the second portion 326 of the loading fluid pathway 314. When the restrictor 336 is in the first position, the increased fluid flow rate of the loading fluid through the second portion 326 increases a speed at which the flow control member 216 (FIG. 1) moves to an open position. When the restrictor 336 is in the second position, the decreased flow rate of the loading fluid through the second portion 326 decreases a speed at which the flow control member 216 (FIG. 1) moves to the open position. The restrictor 336, when positioned in the first position or the second position, causes the flow control member 216 to move from a closed position to an open position at a speed or time that is less than a speed or time at which the flow control member 216 moves from the open position to the closed position.

In some examples, the restrictor 336 may be a fluid control device and/or a solenoid that moves between the first position and the second position. For example, during a loading operation the restrictor 336, when implemented via a solenoid valve, may receive a signal to move to the first position to allow the loading fluid to flow into the loading chamber 312. When exhausting the loading chamber 312, for example, the restrictor 336, when implemented via a solenoid valve, may receive a signal to move to the second position to prevent or significantly restrict fluid flow through the second portion 326 of the loading fluid pathway 314.

Figure 5A:
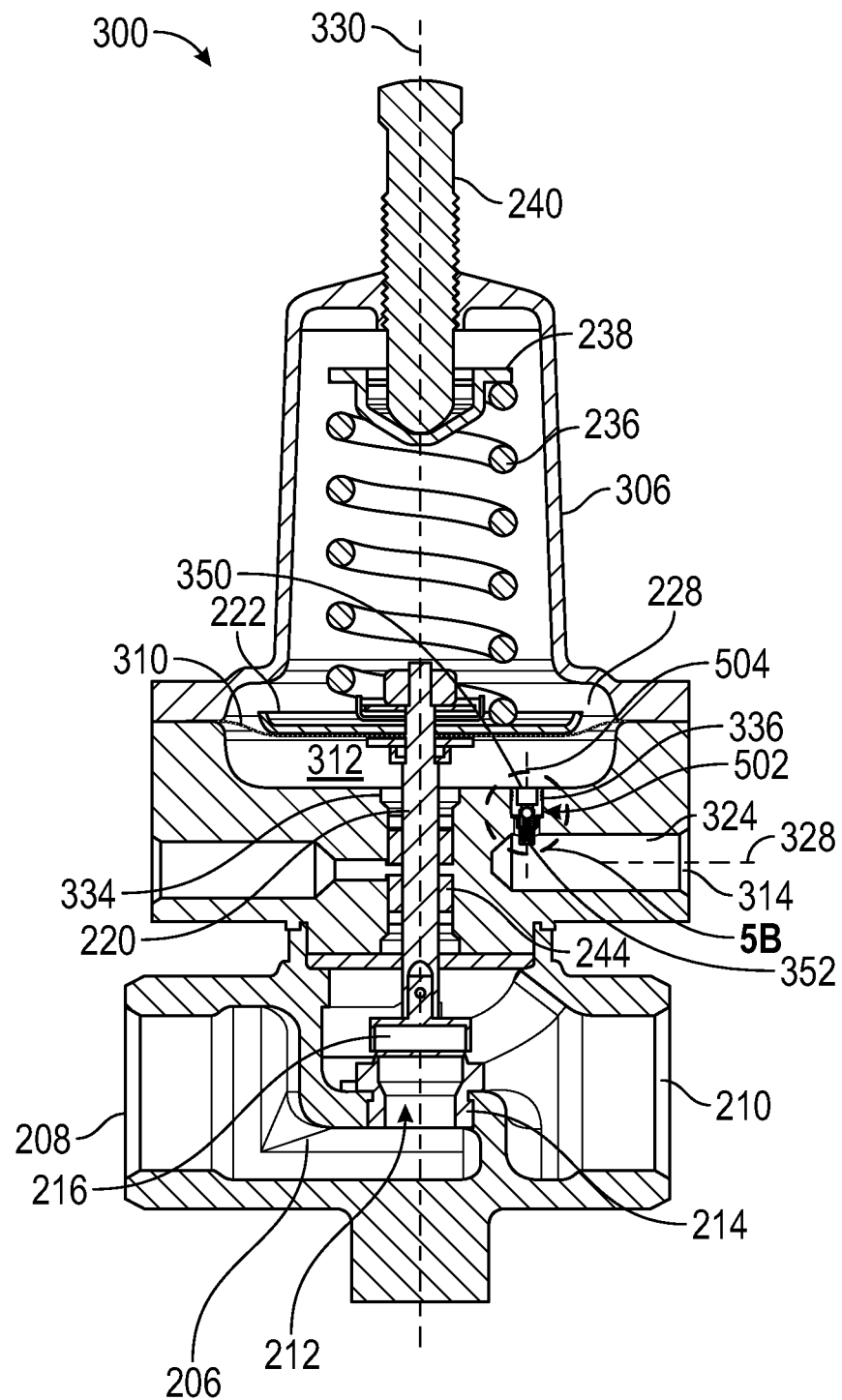
FIG. 5A is a cross-sectional view of the example fluid regulator of FIGS. 3A, 3B and 4.
Figure 5B:
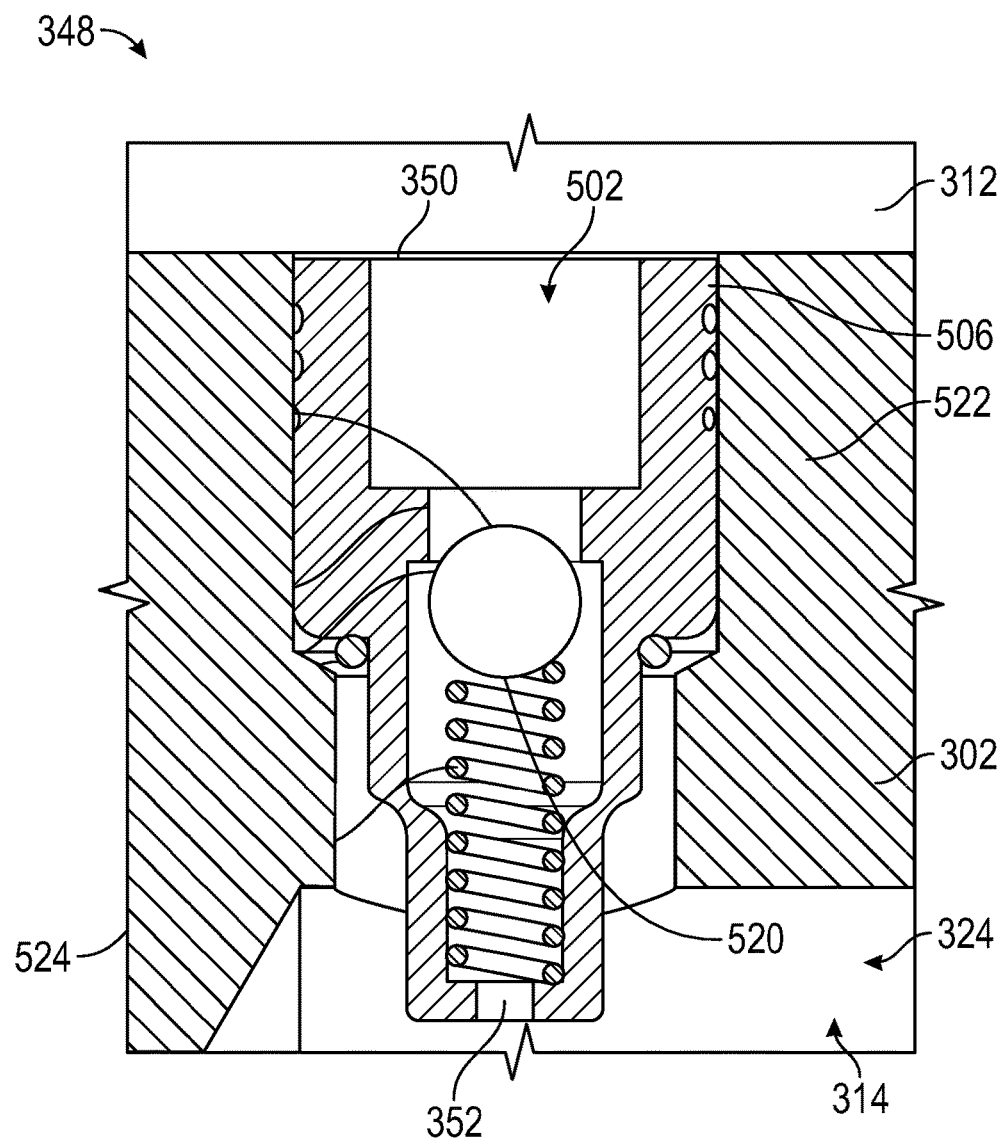
FIG. 5B is a cross-sectional view of the example fluid regulator of FIG. 5A.

FIG. 5A is cross-sectional view of the example actuator 300 and the regulator body 202 of FIGS. 3A, 3B and 4. FIG. 5B is an enlarged portion of the cross-sectional view of the example actuator 300 of FIG. 5A. Referring to FIGS. 5A and 5B, the fluid control device of the illustrated example is a one-way fluid valve (e.g., a check valve). For example, the fluid control device 348 may be a ball check valve. In some examples, the fluid control device 348 may be a solenoid valve and/or any other fluid control device(s) to vent the loading chamber 312.

The fluid control device 348 defines an exhaust passageway 502 between the second inlet 350 in fluid communication with the loading chamber 312 and the second outlet 352 in fluid communication with the first portion 324 of the loading fluid pathway 314. The exhaust passageway 502 of the example fluid control device 348 defines an axis 504 substantially parallel relative to the longitudinal axis 330 and/or substantially perpendicular to the axis 328 of the first portion 324 of the loading fluid pathway 314. In the illustrated example, the axis 504 of the fluid control device 348 is spaced apart or laterally offset relative to the longitudinal axis 330 and/or the central opening 334 of the first housing portion 304. The axis 504 is laterally offset relative to the axis 332 of the second portion 326 of the loading fluid pathway 314.

Referring to FIG. 5B, the fluid control device 348 defines a body 506 positioned within a bore 508 of the first housing portion 304. One or more seals 510 are positioned within the bore 508 between an outer surface of the body 506 and an inner surface of the bore 508 to prevent the loading fluid in the loading chamber 312 from leaking to the first portion 324 of the loading fluid pathway 314. The fluid control device 348 of the illustrated example includes a flow control member 512 (e.g., a ball) biased toward a seating surface 514 via a biasing element 516 (e.g., a spring). Thus, the biasing element 516 biases the flow control member 512 to sealingly engage the seating surface 514 to prevent fluid flow through the exhaust passageway 502 between the second inlet 350 and the second outlet 352 when the fluid control device 348 is in a closed position.

The fluid control device 348 moves to the closed position to prevent fluid flow through the exhaust passageway 502 when a force or pressure provided on a first side 518 of the flow control member 512 (e.g., in a downward direction 522 in the orientation of FIG. 5B) is less than a force or pressure provided on a second side 520 of the flow control member 512 (e.g., in an upward direction 524 in the orientation of FIG. 5B) opposite the first side. For example, a loading fluid flowing through the loading fluid pathway 314 and a loading fluid in the loading chamber 312 provide substantially equal pressures or forces on the first and second sides 518 and 520 of the flow control member 512, thereby causing the force of the biasing element 516 to move the flow control member 512 into sealing engagement with the seating surface 514. Thus, when the loading fluid is fluidly coupled to the loading chamber 312, the fluid control device 348 is in a closed position to prevent the loading fluid in the loading chamber 312 from flowing toward the first portion 324 of the loading fluid pathway 314.

The fluid control device 348 moves to an open position to allow the loading fluid in the loading chamber 312 to flow to the first portion 324 of the loading fluid pathway 314 when a force or pressure on the first side 518 of the flow control member 512 is greater than a force or pressure on the second side 520 of the flow control member 512 (e.g., provided by the biasing element 516 and a pressure in the first portion 324 of the loading fluid pathway 314). When the loading fluid is removed or prevented from flowing through the first portion 324 of the loading fluid pathway 314, the pressure of the loading fluid in the loading chamber 312 exerts a force on the actuation member 310 that overcomes the force of the biasing element 516. Thus, the fluid control device 348 of the illustrated example allows fluid in the loading chamber 312 to vent when a pressure in the loading chamber 312 is substantially greater than a pressure in the loading fluid pathway 314 (e.g., the first portion of the loading fluid pathway). For example, referring also to FIG. 3A, to move the flow control member 512 to an open position and vent the loading chamber 312, the solenoid valve 342 moves between the second position and the third position to couple the inlet port 316 to the exhaust line 354 via the tubing 344. When the solenoid valve 342 is in the third position, the loading fluid from the loading fluid line 346 is prevented from flowing to the inlet port 316 via the tubing 344. Instead, the loading fluid pathway 314 is fluidly coupled to the exhaust line 354 via the tubing 344. When the exhaust line 354 is coupled to a main line downstream from the outlet 210 (e.g., as shown in FIGS. 1 and 2), the pressure of the supply fluid downstream from the outlet 210 is less than the pressure of the loading fluid. Thus, if the first portion 324 of the loading fluid pathway 314 registers a pressure of the downstream supply fluid via the exhaust line 354, the force of the biasing element 516 and the pressure of the downstream supply fluid (e.g., registered in the first portion 324) is not sufficient to overcome a force provided to the second side 520 of the flow control member 512 by the loading fluid in the loading chamber 312, thereby causing the flow control member 512 to move away from the seating surface 514 to the open position until the loading fluid is vented from the loading chamber 312. The fluid control device 348 enables the loading fluid to vent from the loading chamber 312 relatively quicker than a rate at which the restrictor 336 enables the loading chamber 312 to fill with the loading fluid. In this manner, the fluid control device 348 enables the flow control member 216 to move from the open position to the closed position significantly faster (e.g., almost instantaneously, less than one second, less than 3 seconds, etc.) than a speed or time at which the restrictor 336 enables the flow control member 216 to move from the closed position to the open position (e.g., greater than 3 seconds, between about 3 seconds and 10 seconds, etc.).

Figure 6:
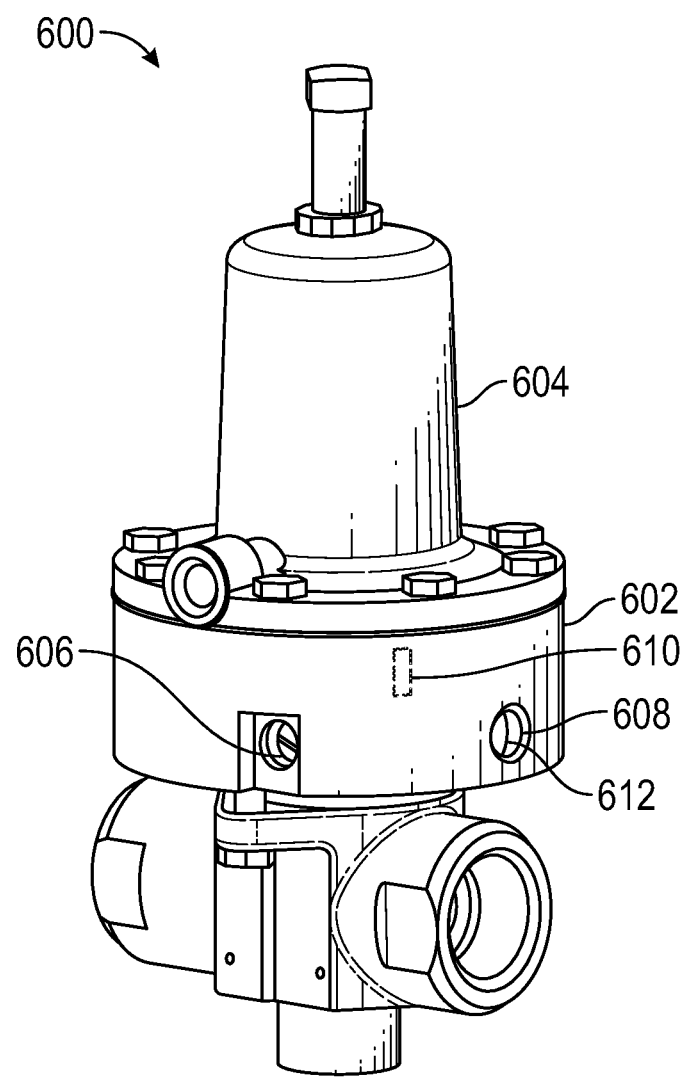
FIG. 6 illustrates another example fluid regulator constructed in accordance with the teachings of this disclosure.

FIG. 6 illustrates another example actuator 600 configured in accordance with the teachings of this disclosure. For example, the example actuator 600 may implement the example fluid regulator 102 of FIGS. 1 and 2. The example actuator 600 of the illustrated example includes a first housing portion 602 coupled to a second housing portion 604. The first housing portion 602 includes a speed control device or restrictor 606 to control a flow rate of a loading fluid flowing between an inlet port 608 and a loading chamber defined by the actuator 600. Additionally, the actuator 600 includes a flow control device 610 (e.g., a check valve similar to the fluid control device 348) positioned within the actuator 600 to vent the loading chamber of the example actuator 600. The loading chamber may be exhausted through the inlet port 608 or another exhaust pathway not passing through the inlet port 608. Further, a solenoid valve 612 (e.g., the solenoid valve 258) is positioned inside the actuator 600 between the inlet port 608 and the loading chamber (e.g., the second chamber 230 or 312). In other words, the solenoid valve 612 is positioned within a dimensional envelope of the actuator 600.

In some examples, the example actuators 204, 300 and/or 600 disclosed herein may be factory assembled with the regulator body 202. In some examples, the example actuators 204, 300 and/or 600 and/or the example second housing 226 or the first housing portions 304 and/or 602 may retrofit existing regulators and/or fluid control devices in the field. Thus, the example actuators 204, 300 and/or 600 and/or the example second housing 226 or the first housing portions 304 and/or 602 disclosed herein may be provided as components to retrofit existing fluid regulators and/or other fluid control devices.

Figure 7:
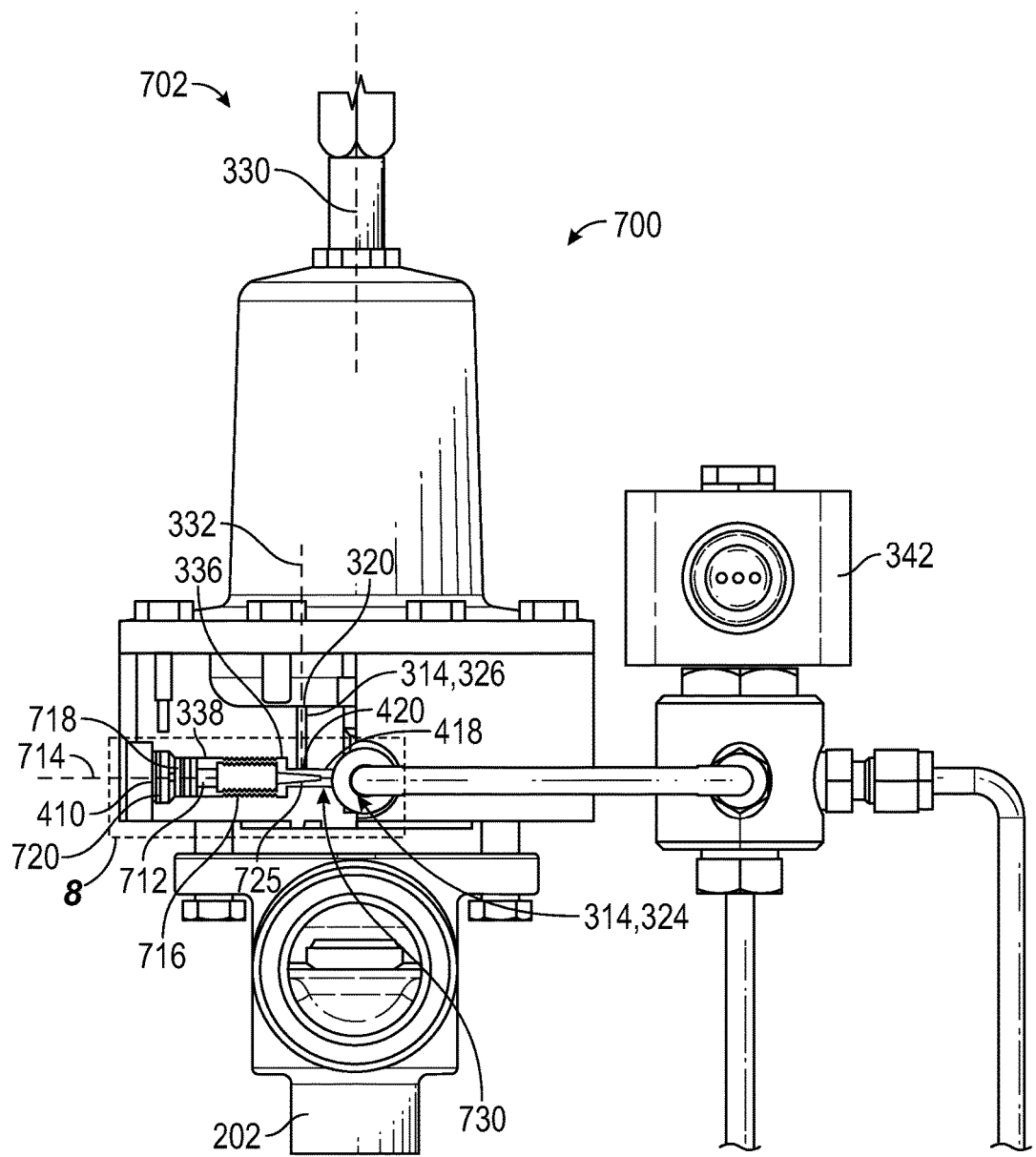
FIG. 7 is a side partial cutaway view of another example fluid regulator constructed in accordance with the teachings of this disclosure.
Figure 8:
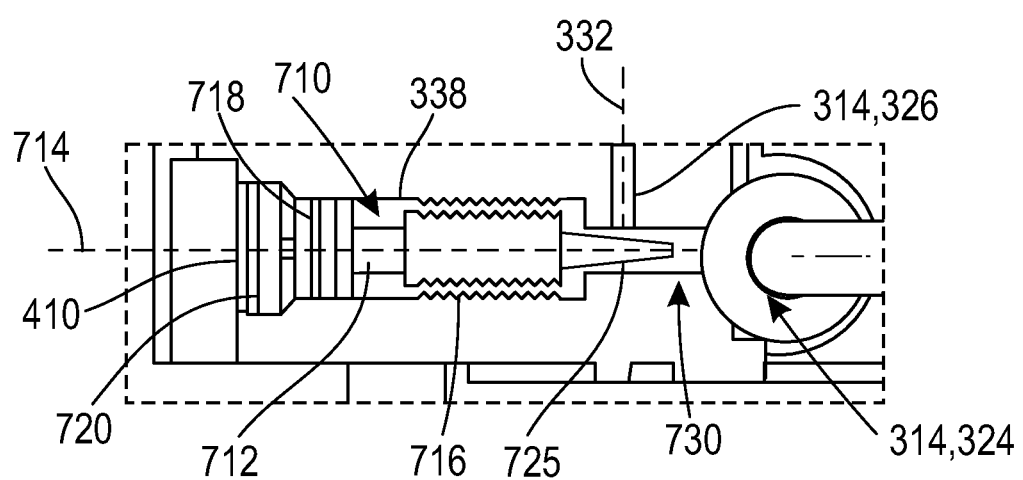
FIG. 8 is a cross-sectional view of a portion of the example fluid regulator of FIG. 7.

FIGS. 7 and 8 illustrate another example fluid regulator 700 and actuator 702 configured in accordance with the teaching of this disclosure. The example fluid regulator 700 and actuator 702 are essentially the same as the fluid regulator 102 and actuator 300 described above and those components of the example fluid regulator 700 and actuator 702 that are substantially similar or identical to the components of the example fluid regulator 102 and actuator 300 described above and that have functions substantially similar or identical to the functions of those components will not be described in detail again below. Instead, the interested reader is referred to the above corresponding descriptions. To facilitate this process, similar reference numbers will be used for like structures.

In some of these examples, fluid regulator 700 may be a failed closed valve, a failed open valve, or any other classification of valve and/or regulator depending on a particular orientation of the valve's components. Fluid regulator 700 has regulator body 202 defining inlet 208, outlet 210, and inlet port 316, access port 338, loading chamber 312 disposed within regulator body 202 and coupled to access port 338, a valve assembly is at least partially disposed between inlet 208 and outlet 210 and in communication with loading chamber 312 to adjust fluid flow at outlet 210 by adjusting a fluid flow rate between inlet 208 and outlet 210, and a restrictor 710 at least partially disposed within access port 338.

The loading chamber 312 and the valve assembly are adapted to be responsive to a change in loading pressure such that a modified rate is achieved. The restrictor 710 is adapted to adjust a response speed in which the modified rate is achieved.

The fluid regulator 700 may further include valve seat 214 at orifice 212 and flow control member 216 of the valve assembly. Flow control member 216 is urged toward contact with valve seat 214 by biasing element 236 (e.g., a spring) contained in first chamber 228. Biasing element 236 engages diaphragm plate 222 to operably coupled to valve stem 220, which is in turn operably coupled to flow control member 216.

As described above, when the loading pressure received at inlet port 316 is at a steady-state value, the pressure in loading chamber 312 is also at a steady-state value. The biasing element 236 exerts a force equal to the pressure within the loading chamber 312 to maintain flow control member 216 in an equalized position relative to valve seat 214. As such, fluid flow between the inlet 208 and outlet 210 is at a constant rate. When the loading pressure received at inlet port 316 changes, the pressure at loading chamber 312 also changes and causes biasing element 236 to adjust to exert an adjusted force equal to the pressure within loading chamber 312. As a result, flow control member 216 is repositioned and fluid flow between inlet 208 and outlet 210 is at a different rate.

Restrictor 710 is disposed within access port 338 to adjust the speed in which loading chamber 312 experiences a change in pressure. Restrictor 710 includes a screw 712 having a longitudinal axis 714 that is substantially perpendicular to axis 332 of second portion 326 of loading fluid pathway 314. Restrictor 710 includes a threaded portion 716 threaded within access port 338 of first housing portion 304 to enable a position of restrictor 710 to move between a first position (e.g., a fully open position) and a second position (e.g., a fully closed position) to vary or adjust a fluid flow rate of the loading fluid flowing to loading chamber 312 via loading fluid pathway 314. Specifically, the flow rate through the loading fluid pathway 314 may be adjusted to various different flow rates between a first flow rate (e.g., a maximum flow rate) when restrictor 710 is in the first position (e.g., a fully open position) and a second flow rate (e.g., a minimum flow rate), less than the first flow rate, when restrictor 710 is in the second position (e.g., a fully closed position). In some examples, restrictor 710 may be friction fit into access port 338 and/or restrictor 710 may include a channel extending the length of restrictor 710 to allow an amount of fluid to flow between access port 338 and loading chamber 312. Restrictor 710 includes a seal 718 to prevent the loading fluid in second portion 326 of loading fluid pathway 314 from flowing through opening 410 of access port 338. A locking pin 720 can retain restrictor 710 within access port 338 and prevent restrictor 710 from being removed (e.g., fully removed) from access port 338. In some examples, locking pin 720 can limit or prevent movement of restrictor 710 beyond the first position. In the illustrated example, a tapered end 725 of restrictor 710 moves within a cylindrical transition portion 730 of loading fluid pathway 314 that fluidly couples first portion 324 and second portion 326.

Restrictor 710 may be moved towards the first position by rotating restrictor 710 in a first direction about axis 714 and may be moved towards the second position by rotating restrictor 710 in a second direction about axis 714, opposite the first direction. In the first position, restrictor 710 is positioned such that tapered end 725 is spaced apart from transition portion 730 to enable fluid flow between first portion 324 and second portion 326 of loading fluid pathway 314. Thus, in the first position, tapered end 725 of restrictor 710 uncovers at least a portion of transition portion 730 to increase a flow rate of the loading fluid flowing to loading chamber 312 via second portion 326 of loading fluid pathway 314. In the second position, tapered end 725 of restrictor 710 is positioned fully extended into transition portion 730 such that tapered end 725 obstructs transition portion 730. Thus, in the second position, tapered end 725 of restrictor 710 obstructs or blocks transition portion 730 to prevent flow of the loading fluid flowing to loading chamber 312 via second portion 326 of loading fluid pathway 314. Restrictor 710 can also be positioned at various positions between the first and second positions to at least partially restrict flow between first portion 324 and second portion 326 of loading fluid pathway 314. As restrictor 710 is withdrawn from the second position, the flow area provided between first portion 324 and second portion 326 slowly increases due to the decreasing cross-sectional area of tapered end 725 and the constant cross-sectional area of cylindrical transition portion 730. Therefore, restrictor 710 is adapted to be at least partially disposed within transition portion 730 to adjustably restrict the flow rate of fluid.

When restrictor 710 is in the first position, the increased fluid flow rate of the loading fluid through second portion 326 increases a speed at which flow control member 216 (FIG. 1) moves to an open position. When restrictor 710 is in the second position, flow control member 216 (FIG. 1) is prevented from moving. When restrictor 710 is positioned between the first and second positions, the decreased flow rate of the loading fluid through second portion 326 compared to the first position decreases a speed at which flow control member 216 (FIG. 1) moves to the open position. Depending on the position of restrictor 710 within transition portion 730, a different portion of the taper of tapered end 725 is disposed within transition portion 730. As the cross-sectional diameter of tapered end 725 of restrictor 710 being disposed within transition portion 730 increases, the flow path rate through transition portion 730 decreases due to the open volume of the flow path decreasing. As a result, the rate in which loading chamber 312 receives the load pressure may be varied or controlled.

Because the outer profile of restrictor 710 contains tapered end 725, the unit may easily be inspected to ensure there is no damage. Further, because the flow rate adjustment is encapsulated within restrictor 710, there is no need for complex arrangements and/or structures.

While various embodiments have been described above, this disclosure is not intended to be limited thereto. Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

What is claimed is:

1. A fluid regulator comprising:
   a valve body defining an inlet, an outlet, a loading port, and an access port;
   a loading chamber disposed within the valve body and coupled to the loading port, the loading chamber in fluid communication with the loading port through a loading fluid pathway and through an exhaust passageway;
   a valve assembly at least partially disposed between the inlet and the outlet and in communication with the loading chamber, the valve assembly adapted to cooperate with the loading chamber to adjust fluid flow at the outlet by adjusting a fluid flow rate between the inlet and the outlet;
   a check valve disposed within the exhaust passageway; and
   a restrictor at least partially disposed within the access port and the loading fluid pathway;
   wherein the loading chamber and the valve assembly are adapted to be responsive to a change in loading pressure such that a modified rate is achieved and the restrictor is adapted to adjust a response speed in which the modified rate is achieved.

2. The fluid regulator of claim 1, wherein the restrictor comprises a tapered end that is adjustable to obtain a plurality of response speeds.

3. The fluid regulator of claim 2, wherein the restrictor further comprises a threaded portion adapted to be threadably inserted into the access port.

4. The fluid regulator of claim 3, wherein upon the loading pressure changing, the loading chamber is adapted to experience a change in pressure which causes the valve assembly to cause the modified rate to be achieved.

5. The fluid regulator of claim 1, further comprising a transition portion positioned between a first portion and a second portion of a loading fluid pathway, wherein the restrictor is adapted to be at least partially disposed within the transition portion to adjustably restrict a flow rate of fluid propagating through the loading fluid pathway.

6. The fluid regulator of claim 1, wherein the restrictor comprises a threaded portion.

7. The fluid regulator of claim 1, further comprising a diaphragm at least partially disposed within the loading chamber, wherein the diaphragm is adapted to move in response to the change in loading pressure to equalize the loading pressure in the loading chamber with a force exerted by a biasing element.

8. The fluid regulator of claim 2, wherein the restrictor includes a seal for sealing the restrictor within the access port.

9. A fluid regulator comprising:
   a valve body defining an inlet and an outlet;
   an actuator that is coupled to the valve body and includes:
      a diaphragm that forms a loading chamber;
      a loading fluid pathway that extends between a loading fluid inlet port and the loading chamber;
      an exhaust pathway that extends between the loading chamber and the loading fluid pathway;
      an access port that extends between an outer surface of the actuator and the loading fluid pathway;
      a restrictor within the access port and extending at least partially into the loading fluid pathway; and
      a check valve within the exhaust pathway.

10. The fluid regulator of claim 9, wherein a position of the restrictor within the access port is adjustable to adjust a flow rate of a loading fluid between the loading fluid inlet port and the loading chamber.

11. The fluid regulator of claim 9, wherein the diaphragm is operatively coupled to a flow control member that is positioned within the valve body.

12. The fluid regulator of claim 11, wherein a fluid pressure within the loading chamber operates on the diaphragm to adjust a position of the flow control member between an open position in which fluid is enabled to flow between the inlet and the outlet and a closed position in which fluid is prevented from flowing between the inlet and the outlet.

13. The fluid regulator of claim 12, wherein the restrictor and the check valve are configured to provide a first duration of a transition from the closed position to the open position and a second duration of a transition from the open position to the closed position.

14. The fluid regulator of claim 13, wherein the first duration is longer than the second duration.

* * * * *

UNITED STATES PATENT AND TRADEMARK OFFICE
CERTIFICATE OF CORRECTION

PATENT NO. : 10,317,917 B2
APPLICATION NO. : 15/945311
DATED : June 11, 2019
INVENTOR(S) : Madhusudhan Reddy Kotragouda Basappa et al.

Page 1 of 1

It is certified that error appears in the above-identified patent and that said Letters Patent is hereby corrected as shown below:

On the Title Page

At item (74), Column 2, Line 1, "LP" should be -- LLP --.

At page 2, item (56), Other Publications, Column 2, Line 18, "Nternational" should be -- International --.

In the Specification

At Column 1, Line 9, "2015," should be -- 2015, now Pat No. 9,939,068, --.

At Column 1, Line 11, "2016," should be -- 2016, now abandoned --.

Signed and Sealed this
Eighteenth Day of February, 2020

Andrei Iancu
*Director of the United States Patent and Trademark Office*